United States Patent
Tseng et al.

(10) Patent No.: US 7,237,714 B2
(45) Date of Patent: Jul. 3, 2007

(54) METHOD OF MAKING COMPUTER BOOTING FROM ANY ONE OF CARD OF MULTI-FLASH CARD READER

(75) Inventors: Tsung-Yi Tseng, Ping Tung Hsien (TW); Brandon Wang, Hsinchu (TW); Ryan Chen, Chang Hua Hsien (TW)

(73) Assignee: Integrated Circuit Solution Inc., Hsinchu (TW)

( * ) Notice: Subject to any disclaimer, the term of this patent is extended or adjusted under 35 U.S.C. 154(b) by 0 days.

(21) Appl. No.: 10/762,234

(22) Filed: Jan. 23, 2004

(65) Prior Publication Data

US 2004/0153638 A1 Aug. 5, 2004

(30) Foreign Application Priority Data

Jan. 30, 2003 (TW) ............................... 92102291 A

(51) Int. Cl.
*G06K 5/00* (2006.01)
(52) U.S. Cl. ...................................... 235/380; 235/375
(58) Field of Classification Search ................ 235/375, 235/380; 713/2
See application file for complete search history.

(56) References Cited

U.S. PATENT DOCUMENTS

| | | | |
|---|---|---|---|
| 6,691,195 B1* | 2/2004 | Aguilar et al. | 710/260 |
| 6,785,807 B1* | 8/2004 | Aguilar et al. | 713/2 |
| 2002/0004874 A1* | 1/2002 | Agata et al. | 711/1 |
| 2003/0093606 A1* | 5/2003 | Mambakkam et al. | 710/305 |
| 2003/0126421 A1* | 7/2003 | Nalawadi et al. | 713/1 |
| 2003/0200379 A1* | 10/2003 | Hollingsworth et al. | 711/103 |
| 2004/0059907 A1* | 3/2004 | Cochran et al. | 713/2 |

* cited by examiner

*Primary Examiner*—Karl D. Frech
(74) *Attorney, Agent, or Firm*—Troxell Law Office, PLLC

(57) ABSTRACT

A method of making a computer booting an operation system from a flash card which is plugged in a multi-card reader having the following steps: at first, a bootable card having a master bootable record or reserve sector written a bootable pattern thereon is prepared. Then if the BIOS of the host computer requests a bootable pattern from the USB storage apparatus, the firmware of the multi-card reader is then provided a logic unit number (LUN)=0 to the host computer if there is a bootable flash card seated at a socket. The socket is not need to be the first socket but arbitrary. Thus, the USB card reader will be convenient for any user.

5 Claims, 1 Drawing Sheet

METHOD OF MAKING COMPUTER BOOTING FROM ANY ONE OF CARD OF MULTI-FLASH CARD READER

BACKGROUND OF THE INVENTION

1. Field of the Invention

The present invention relates to a method of booting a computer by a flash card in multi-card reader/writer, and more particularly to a method of dynamical detecting a bootable card in multi-card reader/writer with an USB (Universal Serial Bus) interface from any one of flash card if it contains a bootable pattern.

2. Description of the Prior Art

With the progressive of the semiconductor technologies, nowadays, high capacity flash memories are much cheaper than ever before. Among products of storage media, the flash memory cards may be the most pocket, miniature and a big hit with public. Furthermore, as a probable storage media, vibration problems often occur in the hard disk whereas it does not found in the flash memory cards. Therefore, the flash memory cards are often selected as one of the best candidates for MP3 player, personal digital assistor, and digital still camera. The user can store the data retrieved at outdoor, and then he or she plugs the memory card into an USB card reader and transfers the data thereof into a hard disk. The flash memory card can then be reuse just by refreshing or formatting the memory or just deleting part of files.

However, owing to main manufacturer do not formulate a universal format for fresh cards, thus a variety of flash card types or formats are popular in the memory market currently. The card formats include compact flash card (CF) type I/II, memory stick (MS), multimedia card (MMC), secure digital card (SD), smart media card (SMC) in the markets. Subsequently, there are many kinds of card readers, such as 3 in 1, 4 in 1, or 6 in 1.

Since the popularity of the USB deice, almost all of personal computers or hand-held computers activated currently BIOS (basic input output system) thereof supporting the computers booting from those USB devices such as USB-ZIP, USB-HDD, USB-FDD or USB card reader or said card reader/writer. Whereas only the flash card located at the first socket is available to boot a computer for current BIOS if a multi-socket flash card reader is desired to boot by BIOS setting. Hence, even though the 6 in 1 or 4 in 1 of USB flash card reader is convenient for user to solve the problems due to non-universal type, however, only a flash card type compliant with the first socket is available for booting. The user thus can only make the flash card have a booting pattern in booting sector if he or she wants to the computer booting from the USB card reader. Therefore, it is not inconvenient for most of users since then he or she must note the flash card type while buying flash card reader and the type of his or her favorite electronic merchandise supported.

Consequently, an object of the present invention is to provide a method to solve the forgoing problem by means of dynamic detecting the sockets of the USB flash card reader. The firmware of the USB flash card reader can make up the deficiency of the BIOS of the host. While the BIOS inquires a bootable pattern from the USB flash card reader, the firmware of the USB flash card reader can respond to the host no matter which sockets a flash card is located. Because in accordance with the present invention, the firmware will automatically detect the bootable pattern from each of flash cards which are plugged in the sockets

SUMMARY OF THE INVENTION

A main object of the present invention is to provide a method to make a computer bootable from a flash card of USB flash card reader. The flash card does not need to be compliant with the type of the first socket but can be others.

The present invention discloses a method of making a computer booting an operation system from a flash card which is plugged in a multi-card reader. The multi-card reader does not care the card is located at first socket or not. The method comprises: at first, a bootable card having a master bootable record or reserve sector written a bootable pattern thereon is prepared. Then if the BIOS of the host computer requests a bootable pattern from the USB storage apparatus, the firmware of the multi-card reader is then provided a logic unit number (LUN)=0 to the host computer if there is a bootable flash card seated at a socket. The socket is not need to be the first socket but arbitrary. Thus, the USB card reader will be convenient for any user.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
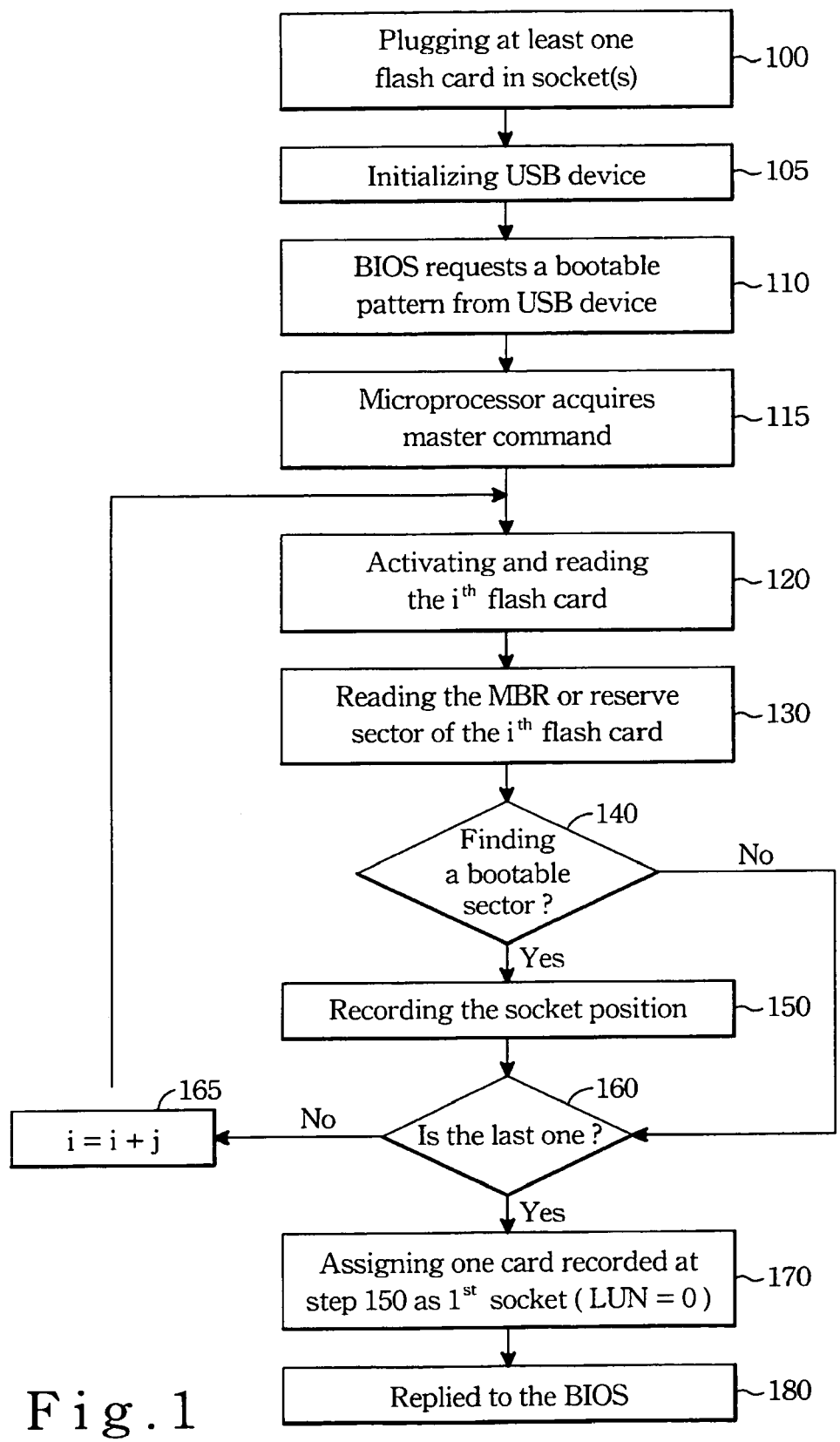
FIG. 1 shows a flow chart of making a computer bootable from a flash card of USB flash card reader according to the present invention.

As described in the background of the invention, whether a flash card having a bootable pattern provided a function for a computer to boot an operation system from an USB flash card reader is mainly determined by the facts that the first flash card is compliant with the type of the first socket of the flash card reader. A user has to take care the flash card type if it is compliant with the type that the first socket supported. Otherwise, the flash card destined to be unbootable even though it contains bootable pattern. The present invention is to overcome such dilemma. According to the preferred embodiment of the present invention, any one of the flash cards compliant with the formats of sockets of the USB flash card reader can provide a booting function if it contains a bootable pattern in the master boot section. The detail descriptions are as follows:

According, an application is provided to format a flash card desired and write a bootable pattern into reserve bytes or reserve sector of the master boot sector (hereinafter called MBR). The second, a firmware is provided which is to detect if a bootable pattern presented at MBR or not while the MBR of one or more flash cards plugged in the sockets of the flash card reader is sequentially read out. If it does, the firmware will give the logic unit 0 to the detected flash card no matter the socket position number it plugged. Therefore, it seems the flash card is plugged in first socket even though it is not true while viewing from BIOS.

Referring to FIG. 1, it shows a flow chart in accordance with the present invention. As is shown in step 100, the step is to make the flash card reader connected with the host. A desired flash card is inserted into a socket of the flash card reader, or something the like, Thereafter, the step 105 is to make a fresh card bootable. When a computer is turned on, the central processor unit (CPU) fetches the BIOS code from the south bridge chip and north bridge chip or from the BIOS CMOS chip. The CPU then tests and detects the peripheral devices, activates the AGP (Advanced Graphics Port) display adaptor card, activates the DRAM and other peripheral devices, such as PCI devices, floppy driver, hard disk driver, CDROM, CDRWM, DVDROM, mouse, and keyboard. Some of the mouse, keyboard are connected through PS2 socket, or USB port. The host then sends standard requests such as "Get Descriptor" and "Set Configure" to process the initialization.

Afterward, as shown in step 110, for booting the operation system, the BIOS requests a bootable pattern from I/O devices when the parameters of the BIOS is set up booting from the USB device. The I/O devices may be a floppy driver, a hard disk driver, or a CDROM. Then the step 115 followed. The firmware of the USB card reader and the microprocessor together acquire the master command.

Subsequently, as shown in step 120, the microprocessor executes the programming code of the firmware to activate and read a first flash card. The flash card seated does not limit to be at first socket number. For example It can be the number "i" where i is an integral. Thereafter, the contents of the MBR or the reserve sector of the flash cards are read out to find a bootable pattern, please see step 130. A decision step 140 is then taken to find if the flash card owned a bootable pattern. If the flash card indeed has a bootable pattern, the corresponding socket position is then recorded, as is shown in step 150 and the step 160 is followed. If the flash card does not own a bootable pattern, the step 150 is skipped and directly skip to step 160.

Please see step 160, the decision step is to determine whether the flash card is the last flash card or not. If it doesn't, the step 160 is followed. That is a next flash card i=i+j (see step 165) is processed and return to the step 120, where "j" is an integral by socked number. And then repeatedly takes the steps 120 through 150. All of the master boot sectors of the flash cards are read sequentially until the last flash card i=f is finished, where f is the last flash card number.

After the microprocessor finished the last flash card, the step 170 is followed. The record of the step 150 may have recorded zero, one or more flash cards own a bootable pattern. In the case at least one flash card has a bootable, a logic unit 0 is then assigned to any one of them (See step 170), replied to BIOS and handed over the command to the operation system (please see step 180).

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest formation so as to encompass all such modifications and similar structure.

What is claimed is:

1. A method of booting an operation system for a computer from a flash card plugged in any socket of an USB multi-card reader, and said method comprises the steps of:
   providing an USB multi-card reader, said USB multi-card reader having a firmware, said firmware being used to determine if a flash card plugged in one of sockets of said USB multi-card reader having a bootable pattern;
   providing a flash card having a bootable pattern in a master boot sector or reserve sector;
   providing a host connected with said USB multi-card reader, said host having a BIOS supporting said USB multi-card reader booting therefrom and said flash card being plugged in one of said sockets; and
   replying a logic unit 0 from said firmware of said USB multi-card reader to said host when said host desires booting an operation system from said flash card.

2. The method of claim 1, wherein when said host requests a bootable pattern from said USB multi-card reader, said host handing over a master command to said firmware and a microprocessor of said USB multi-card reader.

3. The method of claim 1, wherein said USB multi-card reader at least supports two types selected from the group consisting of compact flash card, multimedia card, secure digital card, and smart media card.

4. The method of claim 1, wherein the step of replaying said logic unit 0 is to make said BIOS read said bootable pattern as if said bootable pattern is read out from the first socket of said USB multi-card reader.

5. The method of claim 1, after step of said flash card plugged in one of said socket of said USB multi-card reader, and before the step of replying a logic unit 0, further comprising the steps of:
   said BIOS requesting said USB multi-card reader a bootable pattern;
   a microprocessor of said USB multi-card reader acquiring a master command from said BIOS;
   said microprocessor executing the programming code of said firmware; to activate and read said flash card;
   reading said master boot sector or reserve sector to find a bootable pattern;
   recording a corresponding socket position; and
   assigning said socket position as the first socket.

* * * * *